March 17, 1936.　　　H. WILLIAMS　　　2,034,219
POWER TRANSMITTING DEVICE
Filed Nov. 30, 1934
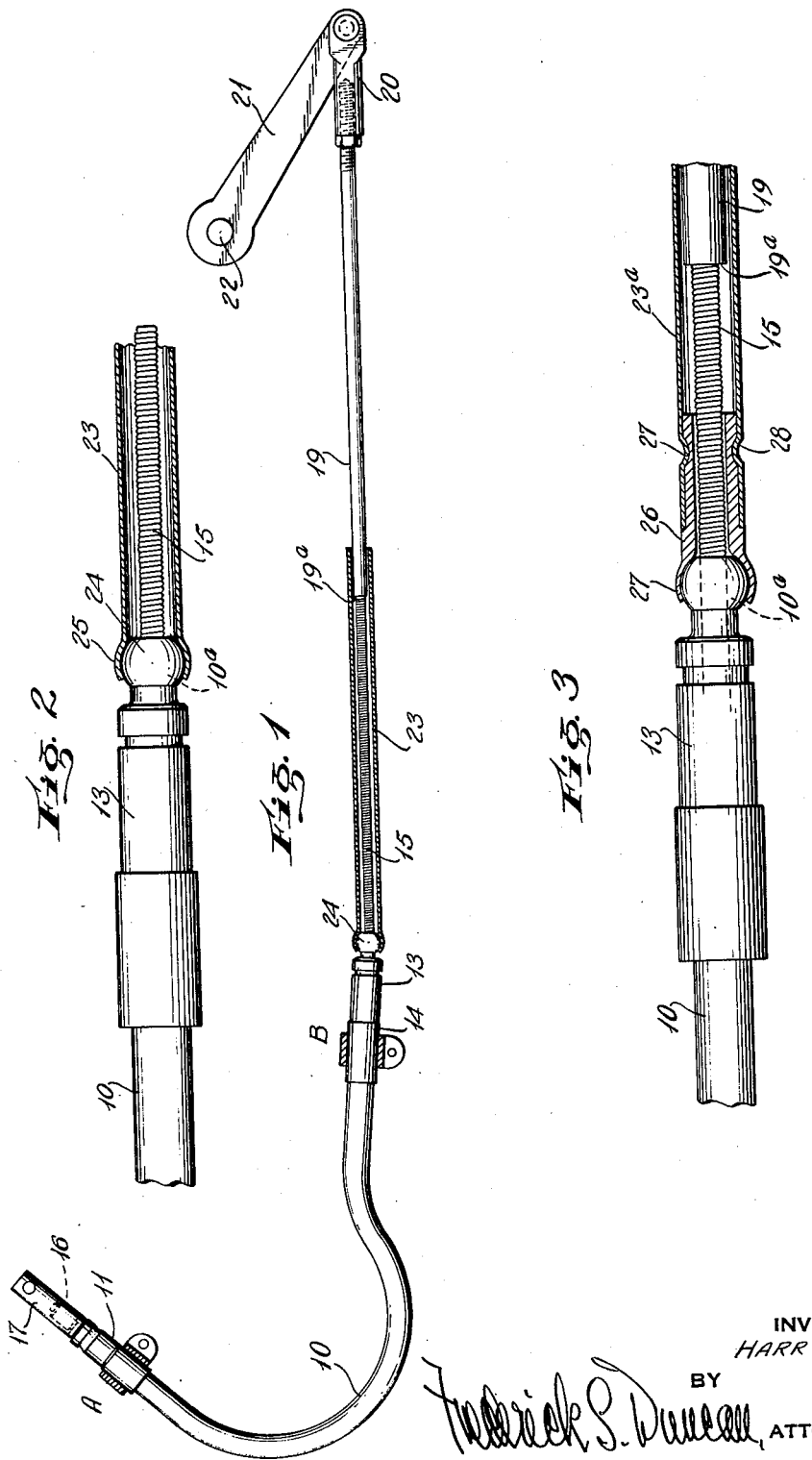
INVENTOR
HARRY WILLIAMS
BY
ATTORNEY Patented Mar. 17, 1936

2,034,219

UNITED STATES PATENT OFFICE 2,034,219

POWER TRANSMITTING DEVICE

Harry Williams, Birmingham, Mich., assignor to American Cable Company, Inc., New York, N. Y., a corporation of Delaware Application November 30, 1934, Serial No. 755,434

3 Claims. (Cl. 74—502)

The present invention relates to devices for transmitting reciprocating motion through a non-rectilinear path, such power transmitting devices comprising an extended power member and an extended guide member therefor, one member being disposed within the other, and power being transmitted by relative longitudinal movement of the members. Usually the guide member consists of a tubular casing which may be either flexible or rigid but which is normally fixed at each end. The power member may be either a cable, a strand, a wire, a flexible rod, etc., capable of transmitting power under tension or compression or both. When power is to be transmitted by such a device to or from an oscillating arm the power member must not only move lengthwise but must also be capable of angular movement in the plane of oscillation of said arm in order to accommodate itself to the arc of travel of its point of attachment to the arm. If the end of the casing extends to a point close to the oscillating arm, it will tend to cramp the power member, while, on the other hand, in the case of push and pull transmission, if the power member is drawn out too far from the casing it is liable to buckle on the compression stroke. In my copending application, Serial No. 685,914, filed August 19, 1933, I provide a structure which will overcome any tendency to cramping or buckling, by forming the casing with a rigid extension portion of larger internal diameter than the casing itself and providing the power member with a rigid terminal rod portion and arranging means on one of said portions forming a fulcrum for relative oscillation of the extension and rod.

An object of the present invention is to provide another structure which will permit angular movement of the power member to accommodate itself to the arc of travel of its point of attachment to an oscillating arm. In the present invention, I provide the casing with an extension which is articulated with the main body of the casing so that it may oscillate with respect to the main casing and thus serve as a guide up to a point close to the oscillating arm.

A more specific object of the invention is to provide a universal joint between the extension and the casing proper so that the extension may be oscillated in any desired plane.

With these and other objects in view, which will appear hereinafter, I shall now describe a preferred embodiment of my invention and a modification thereof and thereafter shall point out the novelty and scope of the invention in the claims.

In the accompanying drawing:

Figure 1 is a side view partly in section of a preferred form of my improved power transmitting device;

Fig. 2 is a view on a larger scale and partly in section of a portion of the structure shown in Fig. 1; and Fig. 3 is a similar fragmental view of a modified form of my invention.

The power transmitting device shown in Figs. 1 and 2 comprises a tubular casing 10 which is preferably flexible, although it may consist of a rigid tube bent to the desired form so that it will extend between a pair of fixed points A and B. The casing, as illustrated, terminates at one end in a ferrule 11 secured by a clamp 12 to a suitable support at the point A. The opposite end of the casing is similarly provided with a ferrule 13 which is fixed by a clamp 14 to a suitable support at the point B. Within the casing is the power member, here shown as an armored strand 15. This armored strand terminates at one end in a head 16 which engages a yoke 17 adapted to be connected to a part (not shown) to be moved. The opposite end of the strand 15 is secured to a substantially rigid extension rod 19 which is connected to a yoke 20 pivoted to an arm 21. This arm in turn is fixed to a power shaft 22. The ferrule 13 is provided with an extension tube 23 articulated thereto, such articulation comprising a ball 24 formed on the ferrule 13 and a socket 25 engaging the ball and formed on the extension tube 23. Thus, the casing member and the power member each has a rigid extension which may be flexed with respect to the main body of the member.

Assuming now that power is being transmitted from the arm 21 to the yoke 17, as the arm is oscillated it describes the arc shown in broken lines in Fig. 1, and by reason of its attachment to the rod 19 it causes the extension tube 23 to oscillate with respect to the ferrule 13. The extension tube has a fairly close sliding fit with the extension rod 19 so that it will guide said rod in its sliding movement. Also, the armored strand 15 will have no room for any substantial amount of buckling within the extension tube.

Obviously, power can be transmitted in the reverse direction from the yoke 17 to the arm 21. In either condition the articulated extension permits the guide member to adapt itself to the arc of travel of the point of connection of the power member to the oscillating arm.

The rod 19 is of larger diameter than the strand 15, forming a shoulder 19a which cannot pass through the bore 10a of the casing 10. The head 16 at the opposite end of the strand prevents the rod 19 from being drawn out far enough to catch on the outer end of tube 23.

In assembling this power device, the rod extension 19 and the head 16 are preferably swedged to the armored strand 15 before the extension tube is applied to the casing. The extension tube is then slipped over the rod 19 and the inner end of the tube which has previously been flared, is now swedged about the ball 24 so as to form a socket which has a snug but free moving fit upon the ball.

The construction shown in Fig. 3 is similar to that shown in Fig. 2, except that a separate socket member is provided to which the extension tube is connected. In this figure parts which correspond to those in Fig. 2 are given the same reference numerals. The socket member above referred to consists of a tubular piece 26 formed with a socket portion 27 which is shaped to fit the ball 24. The tubular body 26 is formed with an annular depression 27 and in assembling the device the extension tube 23a is fitted upon a reduced portion of the body 26 and then is fixed thereto by swedging an annular depression in the extension tube, as shown at 28, to fit the annular depression 27. This forms a more convenient structure to assemble because the socket member may be connected to the ball 24 before assembling the power member within the casing member and thereafter the extension 23a may be very easily applied and secured by swedging it to fit the depression 27. Another advantage of this construction is that it provides a stronger joint because metal of heavier cross-section may be used at the joint than is necessary for the extension tube itself.

While I have described a preferred embodiment of my invention and a modification thereof, it will be understood that these are to be taken as illustrative and not limitative and that I reserve the right to make various changes in form, construction and arrangement of parts without departing from the spirit and scope of my invention as pointed out in the following claims.

I claim:

1. In a power transmitting device of the character described, a tubular casing formed with a terminal ball, a rigid tubular extension of the casing formed with a socket to fit and articulate on the ball, a flexible power member extending through the casing and into said extension member, and a rigid terminal portion fixed to the flexible power member and fitted to slide lengthwise in said tubular extension.

2. A power transmitting device of the character described comprising a tubular casing, a rigid tubular member having ball and socket connection with the casing, a rigid tubular extension of the casing secured to said member, a flexible power member extending through the casing and into said extension, and a rigid terminal portion fixed to the flexible power member and fitted to slide lengthwise in said tubular extension.

3. A power transmitting device of the character described comprising a tubular casing, a rigid tubular member having ball and socket connection with the casing, a rigid tubular extension of the casing secured to said member, and a flexible power member extending through the casing and into said extension, a rigid terminal portion fixed to the flexible power member and fitted to slide lengthwise in said tubular extension, and means at the opposite end of the power member cooperating with the casing at that end to prevent complete withdrawal of said rigid terminal portion of the power member from said tubular extension.

HARRY WILLIAMS.